(12) United States Patent
Backmann

(10) Patent No.: US 11,524,438 B2
(45) Date of Patent: Dec. 13, 2022

(54) APPARATUS AND METHOD FOR FILM PRODUCTION AND/OR FILM PROCESSING

(71) Applicant: Windmöller & Hölscher KG, Lengerich (DE)

(72) Inventor: Martin Backmann, Lengerich (DE)

(73) Assignee: Windmöller & Hölscher KG, Lengerich (DE)

( * ) Notice: Subject to any disclaimer, the term of this patent is extended or adjusted under 35 U.S.C. 154(b) by 224 days.

(21) Appl. No.: 16/327,258

(22) PCT Filed: Aug. 21, 2017

(86) PCT No.: PCT/EP2017/071047
§ 371 (c)(1),
(2) Date: Feb. 21, 2019

(87) PCT Pub. No.: WO2018/036971
PCT Pub. Date: Mar. 1, 2018

(65) Prior Publication Data
US 2019/0193319 A1  Jun. 27, 2019

(30) Foreign Application Priority Data

Aug. 23, 2016 (DE) .................... 10 2016 215 845.7
Oct. 18, 2016 (DE) .................... 10 2016 220 429.7

(51) Int. Cl.
*B29C 48/00* (2019.01)
*B29C 48/08* (2019.01)
*B29C 48/10* (2019.01)
*B29C 48/92* (2019.01)
*B29C 55/28* (2006.01)
*B29C 55/06* (2006.01)

(52) U.S. Cl.
CPC .......... *B29C 48/0018* (2019.02); *B29C 48/08* (2019.02); *B29C 48/10* (2019.02); *B29C 48/92* (2019.02); *B29C 55/28* (2013.01); *B29C 55/06* (2013.01); *B29C 2948/92133* (2019.02); *B29C 2948/92152* (2019.02); *B29C 2948/92447* (2019.02); *B29C 2948/92647* (2019.02); *B29C 2948/92942* (2019.02)

(58) Field of Classification Search
CPC ........... B29C 2948/92133; B29C 2948/92152; B29C 2948/92447; B29C 2948/92647; B29C 2948/92942; B29C 48/0018; B29C 48/08; B29C 48/10; B29C 48/92; B29C 55/06; B29C 55/28
See application file for complete search history.

(56) References Cited

U.S. PATENT DOCUMENTS

| 2,809,519 | A | | 10/1957 | Kaestner | |
| 3,212,127 | A | | 10/1965 | Flook et al. | |
| 3,703,097 | A | | 11/1972 | Kilpatrich et al. | |
| 5,678,447 | A | * | 10/1997 | Graff | B29C 48/92 73/159 |
| 5,778,724 | A | | 7/1998 | Clapp et al. | |
| 2004/0241327 | A1 | * | 12/2004 | Wyatt | B05C 5/0254 427/355 |
| 2007/0085228 | A1 | * | 4/2007 | Nagashima | B29C 41/28 264/1.6 |
| 2008/0170237 | A1 | | 7/2008 | Wysokowski et al. | |
| 2012/0262181 | A1 | | 10/2012 | Scott | |
| 2017/0015043 | A1 | * | 1/2017 | Shimizu | B29C 48/913 |
| 2018/0133946 | A1 | * | 5/2018 | Neuss | B29C 48/92 |
| 2018/0318895 | A1 | * | 11/2018 | Bouby | B21B 38/02 |
| 2019/0255754 | A1 | * | 8/2019 | Lettowsky | B29C 48/08 |

FOREIGN PATENT DOCUMENTS

| EP | 2952330 A1 | | 12/2015 | |
| WO | WO-2015022375 A1 | * | 2/2015 | ........... B29C 48/313 |
| WO | WO2018036971 A1 | | 3/2018 | |

OTHER PUBLICATIONS

Notification of Transmittal of Translation of the International Preliminary Report on Patentability dated Mar. 7, 2019, for PCT/EP2017/071047, 8 pages.

* cited by examiner

*Primary Examiner* — Robert J Grun
(74) *Attorney, Agent, or Firm* — Peter W. Schroen; Bret E. Field; Bozicevic, Field & Francis LLP

(57) ABSTRACT

The invention relates to an apparatus and to a method for film production and/or film processing, characterized by a device for determining the flatness and/or evenness of the film and for further processing and/or outputting the determined results.

17 Claims, 1 Drawing Sheet

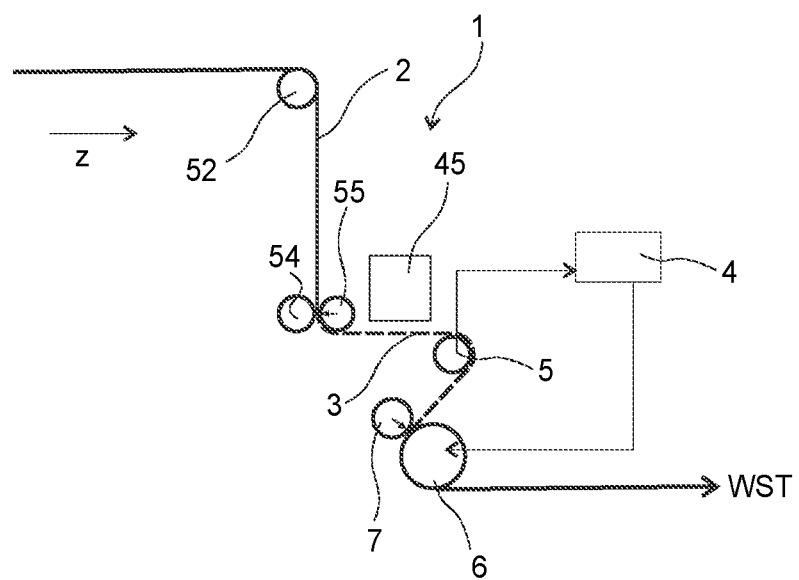

APPARATUS AND METHOD FOR FILM PRODUCTION AND/OR FILM PROCESSING

The invention relates to an apparatus for film production and/or film processing according to the preamble of Claim 1 and to a method according to the preamble of Claim 21.

In the production and/or processing of film, particularly plastic film, the problem often is that the flatness is insufficient, so that the film does not exhibit the necessary quality. The flatness of a film here is defined as a deviation of the length of the film over the width. The length can be, for example, the nominal length or the average length. The evenness of a film indicates how pronounced local deviations of the film in orthogonal direction relative to the film plane are.

For the determination of the flatness and/or evenness, in general, a sample is cut out of the film and then measured with a measuring tape.

However, the high manual effort for carrying out the method has been found to be disadvantageous.

Therefore, the aim of the present invention is to propose an apparatus and a method by means of which this manual effort can be reduced or in the best case be dispensed with entirely.

According to the invention, this aim is achieved by all the features of Claim 1. In the dependent claims, possible designs of the invention are indicated.

BRIEF DESCRIPTION OF THE FIGURE

FIG. 1 shows an apparatus for film production and/or film processing according to an embodiment of the invention.

According to the present invention, a device is provided for determining the flatness and/or evenness of the film and for further processing and/or outputting the determined results.

In other words, a device for determining the flatness and/or evenness is arranged within the apparatus for film production and/or film processing, so the film can be characterized by this device with regard to the flatness and/or evenness, and the flatness and/or evenness do/does not have to be determined manually.

Another advantage is that the flatness and/or evenness can now already be determined during the ongoing production and/or processing of the film, so that, if undesired determined results occur, it is possible to intervene in the production in order to obtain again desired determined results, and/or other measures can be taken. Thus, parts of the film in which the determined results are not desirable can be discarded, for example.

In connection with the flatness and/or evenness, "determination" is understood to mean that the flatness and evenness can be measured directly or can be calculated from measurement results, wherein the measurement results can then be connected with the flatness and/or evenness. However, "determination" should be understood in a broad sense. Thus, for example, the flatness and/or evenness can be dependent on another film parameter, for example, the formulation), the thickness of individual layers and/or the tension at which the flatness and/or evenness are determined. The "determination" then yields not only a single measurement value, but also an entire curve or set of curves.

It is preferable if, by means of the device for determining the flatness and/or evenness, the flatness and/or evenness can be determined over the entire film width. Here, it is preferable if the measurement values which are used as the basis for the determination can be recorded at the same time over the width at a point in longitudinal direction of the film. In this case, in a measurement step, a transverse profile film can be recorded with regard to the flatness and/or evenness, which results in high precision. However, a measurement device which traverses in a direction transversely with respect to the transport direction of the film is also conceivable. Indeed, the same density of measurement values as in the preceding embodiment example cannot be achieved, but such a device has the advantage of a low-cost procurement price.

It is particularly preferable if the device extends at least over the entire film width, in particular, the device has an extension which reaches over the entire film width that can be produced and/or processed maximally by means of the apparatus. In the case of an extension over the entire film width, measurement values can be recorded on a short path, i.e., no measurement values of points on the film have to be recorded, which, viewed from the measurement element, would lie at a slant, i.e., not in orthogonal direction relative to the film plane. This decreases the effort for determining the flatness and/or evenness and moreover increases the precision of the determined values.

In another advantageous embodiment of the invention, it is provided that the determination of the flatness and/or evenness of the film can be carried out repeatedly at time intervals. Here, it is provided that the film can be transported or is transported in a transport direction. The time intervals can here be constant, i.e., the determination, in particular the measurements which are the basis for the determination, is carried periodically. Preferably, the time interval corresponds to the idle time of the device. i.e., the maximum possible number of measurements is carried out. However, the time intervals can also be different. Thus, it is possible to provide that, at the beginning of a film production and/or film processing, a larger number of measurement values are recorded, i.e., the time intervals is short in comparison to the time interval when the film production or processing already has taken place for some time. This can be advantageous, since, at the beginning of a film production and/or processing, parameters that have an influence on the flatness and/or evenness often still need to be adjusted or optimized. In particular, in connection with a simultaneous measurement over the entire film width, the measurement at time intervals has the advantage that a topography of the film can be determined, that is to say, for example, the indication of height as a function of the point or of the area section on the film surface, at which the determination has been carried out. Thereby, a very high measurement point density is achieved, wherein the measurement elements are preferably arranged in rows.

In an advantageous development of the invention, a device for determining the tension is provided, by means of which the tension of the film in the area of action of the device for determining the flatness and/or evenness of the film can be determined. In particular, with this device, the tension can also be set or controlled or even adjusted. Thus, the prerequisite on the apparatus side is provided, which is necessary for determining the flatness and/or evenness as a function of the tension of the film. If the tension additionally or alternatively can be controlled or adjusted, then the determination of the flatness and/or evenness can occur with identical tension, so that directly comparable determined results are obtained. Thus, in particular the computation effort needed to obtain comparable determined values can be reduced. In the case of a control and/or adjustment of the tensile force, it is advantageous that the tensile force be set to a value of less than 500 N, in particular less than 100 N, advantageously to less than 50 N and preferably to less than 10 N.

In another design of the invention, at least two devices for determining the flatness and/or evenness of the film are provided, by means of which, for the upper side and the lower side of the film, in particular of a double-layer film, the respective flatness and/or evenness can be determined independently of one another. Thus, the invention can also be used if a film is not produced and/or processed as a flat web, but also if, for example, a flat lying film tube is provided. This development is also advantageous if, for a single-layer film, the determination of the flatness and/or evenness is provided from both sides, for example, in order to obtain redundant determined values.

It is preferable if the apparatus for film production and/or film processing comprises an evaluation and control device, to which the determined results or the measurement values can be transmitted and with which other components of the apparatus can be controlled. Components of the apparatus can here directly influence the properties of the film; however, they can also be components by means of which this is not possible, in particular components which are used for information. Here, it is advantageous that the determined values are used in order to carry out a certain action.

Here it is preferable if, by means of the evaluation and control device, an output tool can be controlled, by means of which data and/or indications concerning the flatness and/or evenness of the film can be output. This can be a screen, in particular an operating console of the apparatus, but also a printer. However, an output tool can also be an apparatus which generates data packets and sends them via a network to a remote receiving apparatus such as a Smartphone, for example, Data and/or indications can here be the determined values, but also warnings which indicate a deviation of the flatness and/or evenness from target values. Here, it is advantageous that an operator can be informed about the flatness and/or evenness of the film, so that the operator can monitor the flatness and/or evenness and optionally intervene in the machine control in order to monitor the flatness and/or evenness of the film. In particular, the design in which data packets for transmission to a mobile terminal are provided is advantageous since a user can monitor at the same time several apparatuses of the type according to the invention.

In an advantageous variant of the invention, it is provided that, by means of the evaluation and control apparatus, a recording device, in particular a memory device, can be actuated, by means of which determined results with regard to the flatness and/or evenness of the film can be recorded, in particular stored. Here, it is advantageous that the determined results can also be retrieved at a later time for further processing or evaluation, for example, for comparison with more recent determined values or for the determination of quality numbers. Moreover, it is advantageous if, in addition to the determined results, yet other data can be stored and associated with the determined results, such as, for example, the formulation and parameters of the film and parameters of the apparatus during the production of this film. The parameters of a film roll generated from this film can also be stored and associated with the determined results, such as, for example, the winding thickness, data on winding pockmarks or information on edge construction, on folding, on the conicity of the winding, on tin canning, on transverse folding or on the telescoping of the uppermost layers.

In a particularly preferred embodiment of the invention, by means of the evaluation and control apparatus, the determined results can be compared with at least one target value. In the case of a deviation from this target value, by means of the evaluation and control device, other components and/or production or processing parameters of the apparatus can be actuated. For this purpose, for example, the production and processing speed can be adjustable, and a temperature control of the film can occur additionally and/or be adjustable. A temperature control can here be carried out in a contactless manner via supply of blown air or radiation exposure, for example, by infrared radiation. Moreover, a change in the tension is conceivable. In another variant, the film can be elongated easily—possibly plastically—in the sport direction and/or transversely to the transport direction, wherein the elongation can also be changed by the evaluation and control device. An elongation which changes only the flatness and/or evenness of the film, without significantly influencing other film properties, is in the range of less than 5%. An additional production and processing parameter can be the winding tightness, if the film is wound. The advantage of this embodiment of the invention is an automatic adjustment without intervention of the machine operator, in order to achieve an optimal flatness and thus a highest possible quality of the film.

In another embodiment of the invention, it is provided that, based on the determined values, at least one quality number can be determined. A quality number can indicate, for example, the extent of the average deviation of the flatness from the ideal flatness. The advantage is that a user of the film can evaluate, on the basis of the quality number, whether and how the film is suitable for the desired use.

In another advantageous design of the invention, it is provided that the determined values and/or the at least one quality number for at least one film roll can be determined individually and/or associated uniquely with said film roll. However, such a quality number and/or determined values can also be determinable for individual film sections and be associated therewith. A produced or processed film is often cut in longitudinal direction and in this manner forms individual so-called panels. If the film is wound in a winding direction, then individual windings are formed one after the other; in the case of a longitudinally cut film, in each case individual windings are formed one after the other for each panel. A quality number can be associated with each one of these film sections wound on a winding. On the basis of a unique coding of the winding, the associated quality number can be retrieved from a data memory. For this purpose, the winding can bear a QR or a DataMatrix code. The quality number can be stored directly on the winding in a suitable manner, for example, by a bar code or an RFID tag.

In an advantageous embodiment of the invention, the device for determining the flatness and/or evenness of the film comprises a distance measuring device, by means of which, over the width of the film, the distance from a reference line can be determined. Such a reference line can be, for example, the arrangement of several individual measurement elements on a common support, so that all the measurement elements with respect to the position represent the reference line. Thus, in transverse direction of the film, a flatness profile can be established. In combination with repeated measurements at different sites in longitudinal direction of the film, a topography of the flatness can be established.

In another advantageous design of the invention, it is provided that the device for determining the flatness and/or evenness of the film comprises an optical distance-measurement system, in particular a laser range finding. The advantage of an optical distance measurement is that the film does not have to be touched, so that its properties are not changed due to the measurement. A suitable method is laser interferometry, in which the distance can derived from a phase shift of a light beam reflected by the film with respect to the emitted light. Another suitable method is laser triangulation, wherein, instead of a laser, a light emitting diode can also be used. Viewed in transverse direction of the film web, several lasers or light emitting diodes can be arranged, which emit an electromagnetic radiation whose wavelength does not necessarily lie within the visible range. The radiation reflected by the film is detected in each case by sensors associated with a laser in accordance with one of the above-mentioned methods. Such radiation/detector units can in each case be arranged on a common support at a distance of a few centimeters or even millimeters, for example, at a distance of 1 mm to 20 cm, with respect to one another. Thus, in particular if the distance between the sensors is small, a very high resolution image of the flatness can be established.

In another advantageous embodiment of the invention, it is provided that the device for determining the flatness and/or evenness comprises a contacting distance-measurement system. Such a measurement system can be advantageous for measuring transparent films, in which only little light or no light is reflected, since optical methods cannot be used here. A contacting measurement system can comprise a roller which has a very soft outer coating on which the film rolls and which is pressed in more strongly by the protruding areas of the film than by the areas which do not protrude or protrude only slightly. In the interior of such a roller, path, distance or pressure sensors can then be provided, which can then quantify the local displacements of the soft outer coating due to the height differences of the film. If path sensors are used, then, for example, reflecting particles can be applied directly to the outer surface of the roller, and the outer coating can be transparent to electromagnetic radiation of appropriate wavelength. In this manner, in turn, again by laser interferometry, the path differences resulting due to different deflections can be measured directly as changing distances of the reflecting particles, thus allowing a determination of the flatness of the film. Pressure sensors are capable of measuring imprints in the roller, which result due to the flatness of the film.

In another embodiment of the invention, over the width of the film, at different sites, the web tractions can be measured. For this purpose, a segmented measuring roller is conceivable, which, viewed in axial direction, is provided with tensile force sensors working independently of one another. The absolute or relative tensile forces measured by the individual tensile force sensors are then a measure of the flatness.

Moreover, preferably, if the device for the determination of the flatness and/or evenness is arranged between two draw devices, by means of which in each case the web tension can be set. By means of these draw devices, the web tension can be set and in particular adjusted, so that a web tension can be set at which a desired influence can be applied to the flatness of the film. In particular, it can be provided that the web tension is zero, so as not to influence to the extent possible the flatness of the film for the purpose of the measurement.

In a preferred embodiment, the inventive apparatus can be designed as a blown film installation. The production of blown films is a very efficient film production method, and therefore the provision of a device for determining the flatness and/or evenness in such an apparatus promises particularly advantageous economic advantages.

In another advantageous embodiment, the inventive apparatus can be designed as a flat film installation, in which a melt web is given directly to a cooling roller, on which the film quickly solidifies. Transparent films can be produced particularly satisfactorily by means of a flat film installation.

However, apparatuses according to the invention can also be apparatuses which process or further process a film which has already been produced. In particular, such apparatuses can be a stretching installation, in particular an MDO installation, in which the film is elongated in the transport direction, a temperature control device or a rewinding device. In a rewinding device, the film is unwound from a winding, cut in longitudinal direction and then rewound. In general, it is advantageous if the apparatus is a winding device or at least comprises a winding device. In this case, it is advantageous if the device for the determination of the flatness and/or evenness of the film, viewed along the transport path, is arranged before the winding device.

The above-mentioned aim is also achieved by a method having all the features of Claim 21.

Accordingly, it is provided that the flatness and/or evenness of the film is/are determined and that the determined results are further processed and/or output. By this method, the same advantages are achieved as those already described in connection with an inventive apparatus.

Preferably, here, by means of the device for determining the flatness and/or evenness of the film, the flatness and/or evenness is/are determined over the entire width of the film. However, it can be sufficient here if, viewed over the width, only individual points are measured, to save time and/or costs.

In addition, it is possible for the determination of the flatness and/or evenness of the film to be carried out repeatedly at time intervals. Naturally, a continuous measurement is also conceivable.

Overall, by means of these two embodiments, the entire film surface can be determined with regard to the flatness.

Preferably, the determined results are transmitted to an evaluation and control device, and other components of the apparatus are controlled by means of the evaluation and control device. This means thus that not only the flatness and/or the evenness is/are determined, but also that the results are also used in an appropriate manner during the film production or processing, in particular in order to be able to influence the production.

Here, it is particularly advantageous that, by means of the evaluation and control device, the determined results are compared with at least one target value and that, in the case of a deviation from this target value, by means of the evaluation and control device, other components of the apparatus are actuated.

Other advantages, features and details of the invention result from the following description in which, in reference to the figures, different embodiment examples are explained in detail. The features mentioned in the claims and in the description in each case can be essential for the invention individually or in any combination of said features. In the context of the entire disclosure, features and details which are described in connection with the inventive method naturally are naturally also applicable in connection with the inventive apparatus for film production and/or film processing and in each case vice versa, so that, with regard to the disclosure reference is or can always be made mutually to the individual aspects of the invention.

FIG. 1 shows an apparatus 1 according to the invention for achieving and/or maintaining a defined web tension of a film 2. The film 2 is transported in the direction of the transport path z via a roller 52. At least one of rollers 54, 55 represents a draw device of the apparatus 1. Within the apparatus 1, the film is represented by a broken line and bears the reference number 3 in this area. This fact indicates that the web tension of the film in this area is influenced and differs in particular from the web tension upstream and/or downstream. The film 3 runs over the draw device 6, through which the film can be subjected to a tensile force. The production and processing speed is specified by the evaluation and control device 4. A roller 7 is positioned against the draw device 6. The film web 3 leaves the draw device 6 in the direction of the arrow marked with WST. This means that the film web is wound up to form a roll, for example on a winding device (not shown).

The web tension that the film has in the area between the draw device 55 and the draw device 6 is determined by means of a sensor 5. In the present figure, this sensor 5 is designed as a web tension measuring roller by way of example. The web tension measured by this sensor is fed to the evaluation and control device 4 as a measured value. This compares this measured value with a predetermined target value for the web tension and controls the drive of the draw device 6 if the deviation is too great, resulting in a changed speed.

Reference numeral 45 denotes a measurement device for detecting the quality property of the film as part of the apparatus 1, which preferably carries out an optical measurement of the film, in particular a laser triangulation measurement for detecting the flatness of the film. The measuring device detects the quality property of the film in the area between the draw devices 55 and 6.

The invention claimed is:

1. An apparatus for film production or film processing, the apparatus comprising:
    two draw devices by means of which the web tension of the film can be set;
    a device for determining the flatness or evenness of the film and for further processing or outputting the determined results, wherein the device for determining the flatness or evenness of the film is arranged between the two draw devices, and further wherein the device for determining the flatness or evenness of the film comprises:
    a distance measurement device, by means of which, over the width of the film, the distance from a reference line can be determined, or
    an optical distance measurement system or a contacting distance measurement system; and
    a device for determining the tension of the film by means of which the tension of the film can be determined in the area of the device for determining the flatness or evenness of the film.

2. The apparatus according to claim 1,
characterized in that,
by means of the device for determining the flatness or evenness of the film, the flatness or the evenness can be determined over the entire film width.

3. The apparatus according to claim 1,
characterized in that
the device for determining the flatness or evenness of the film extends over the entire width of the film.

4. The apparatus according to claim 1,
characterized in that
the determination of the flatness or evenness of the film can be carried out repeatedly at time intervals.

5. The apparatus according to claim 1,
characterized in that
at least two devices for determining the flatness or evenness of the film are provided, by means of which, for the upper side and the lower side of the film, in particular of a double-layer film, the flatness or the evenness can be determined independently of one another.

6. The apparatus according to claim 1,
characterized in that
an evaluation and control device is provided, to which the determined results can be transmitted and by means of which other components of the apparatuses can be controlled.

7. The apparatus according to claim 6,
characterized in that,
by means of the evaluation and control device, an output tool of the apparatus can be controlled, by means of which data or indications concerning the flatness or evenness of the film can be output.

8. The apparatus according to claim 6,
characterized in that,
by means of the evaluation and control device, a recording device, in particular a memory device, can be actuated, by means of which determined results can be recorded, in particular stored.

9. The apparatus according to claim 6,
characterized in that,
by means of the evaluation and control device, the determined results can be compared with at least one target value, and
in case of a deviation from this target value, other components of the apparatus can be actuated by said evaluation and control device.

10. The apparatus according to claim 1,
characterized in that,
based on the determined results, at least one quality number can be determined.

11. The apparatus according to claim 10,
characterized in that
the determined results or the at least one quality number for at least one film roll can be determined individually and uniquely associated with said roll.

12. The apparatus according to claim 1,
characterized in that
the device for determining the flatness or the evenness of the film comprises a distance measurement device, by means of which, over the width of the film, the distance from a reference line can be determined.

13. The apparatus according to claim 1,
characterized in that
the device for determining the flatness or evenness of the film comprises an optical distance measurement system or a contacting distance measurement system.

14. The apparatus according to claim 1,
characterized in that
a blown film installation or a flat film installation or a device for stretching the film is provided.

15. The apparatus according to claim 1,
characterized in that
a winding device is provided, and
the device for determining the flatness or evenness of the film, viewed along the transport path of the film, is provided before the winding device.

16. The apparatus according to claim 1, wherein the two draw devices are configured to set the web tension of the film to less than 50 N.

17. The apparatus according to claim 1, wherein the two draw devices are configured to set the web tension of the film in response to the tension of the film determined by device for determining the tension of the film.

* * * * *